United States Patent
Huang et al.

(10) Patent No.: US 8,525,801 B2
(45) Date of Patent: Sep. 3, 2013

(54) EQUALIZED CAPACITIVE TOUCHPAD AND TOUCH POSITIONING METHOD

(75) Inventors: Chun-Chung Huang, Hsinchu (TW); Tsun-Min Wang, Changhua (TW); Chun-Yu Lin, Daya Shiang (TW); Tse-Chi Lin, Yunghe (TW)

(73) Assignee: Elan Microelectronics Corporation, Hsinchu (TW)

( * ) Notice: Subject to any disclaimer, the term of this patent is extended or adjusted under 35 U.S.C. 154(b) by 1166 days.

(21) Appl. No.: 12/382,764

(22) Filed: Mar. 24, 2009

(65) Prior Publication Data
US 2009/0244029 A1    Oct. 1, 2009

(30) Foreign Application Priority Data
Mar. 25, 2008    (TW) ............................... 97110626 A (51) Int. Cl.
*G09G 5/00*    (2006.01)
(52) U.S. Cl.
USPC ......... 345/173; 345/174; 345/178; 178/18.06

(58) Field of Classification Search
USPC .................. 345/173–179; 178/18.01–18.09, 178/19.01–19.03
See application file for complete search history.

(56) References Cited

U.S. PATENT DOCUMENTS

| | | | |
|---|---|---|---|
| 5,940,064 A * | 8/1999 | Kai et al. ....................... | 345/173 |
| 7,875,814 B2 * | 1/2011 | Chen et al. ................... | 178/18.07 |
| 2007/0070049 A1 * | 3/2007 | Lee et al. ....................... | 345/173 |
| 2008/0158176 A1 * | 7/2008 | Land et al. ..................... | 345/173 |
| 2008/0158178 A1 * | 7/2008 | Hotelling et al. ............... | 345/173 |

\* cited by examiner

*Primary Examiner* — Kevin M Nguyen
*Assistant Examiner* — Jennifer Nguyen
(74) *Attorney, Agent, or Firm* — Muncy, Geissler, Olds & Lowe, PLLC (57) ABSTRACT

An equalized capacitive touchpad and a touch positioning method for a capacitive touchpad use an equalizer to correct a sensed value detected from a sensing line of the capacitive touchpad, to thereby offset the attenuation of the sensed value due to the impedance of the sensing line. Thus, the sensed values generated from different positions along a sensing line are equalized, and the touch positioning accuracy of the capacitive touchpad is improved.

13 Claims, 13 Drawing Sheets

EQUALIZED CAPACITIVE TOUCHPAD AND TOUCH POSITIONING METHOD

FIELD OF THE INVENTION

The present invention is related generally to a capacitive touchpad and, more particularly, to an equalized capacitive touchpad and a touch positioning method for a capacitive touchpad.

BACKGROUND OF THE INVENTION

Figure 1:
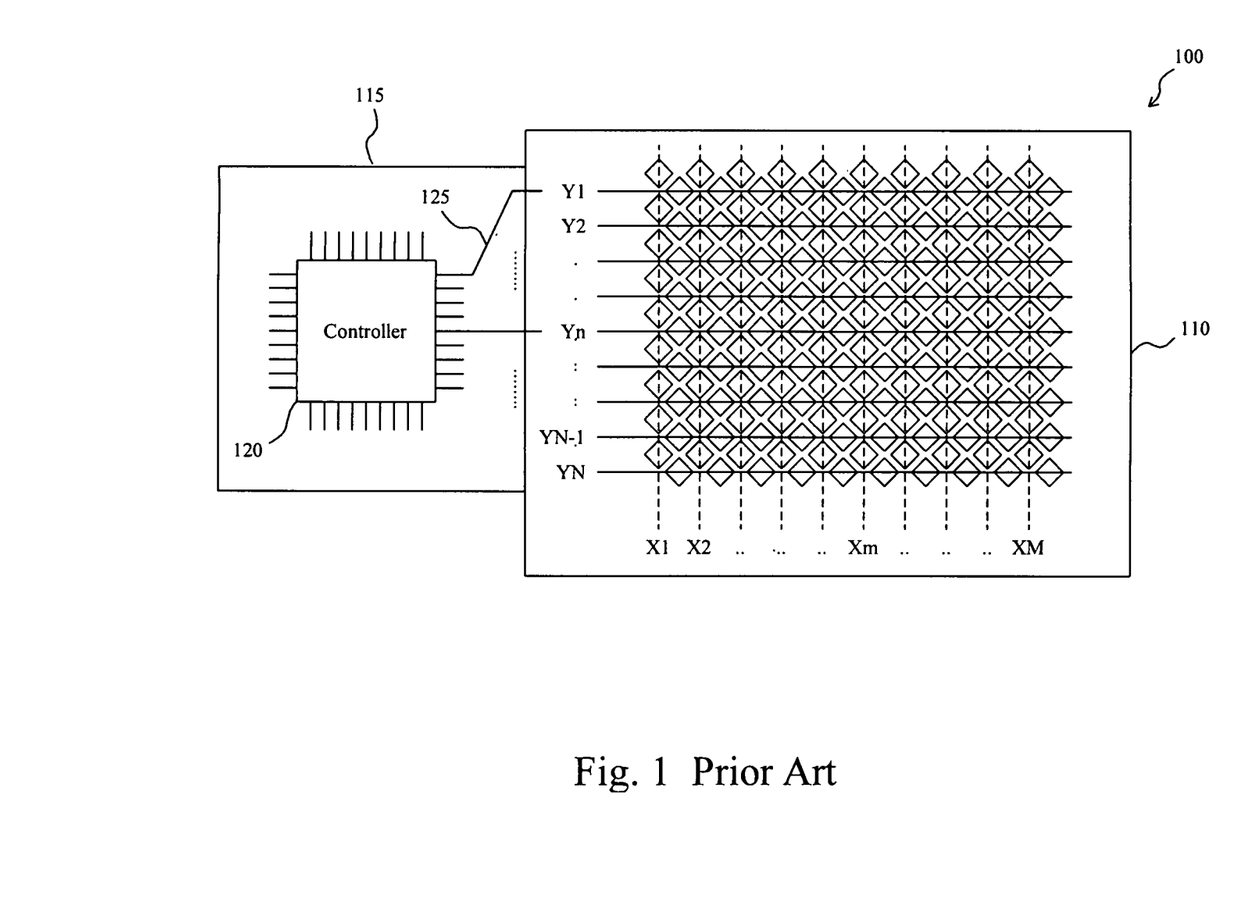
FIG. 1 is a schematic view of a typical capacitive touchpad.

Traditionally, the touch sensor of a capacitive touchpad is realized by a printed circuit board (PCB). However, the opaqueness of the PCB restricts applications of the capacitive touchpad in cell phones, personal digital assistants (PDAs), multi-media display panels and other electronic products. Transparent electrically conductive films, such as indium tin oxide (ITO) and indium zinc oxide (IZO), can be used to replace the PCB traces for transparent applications. Alternatively, a transparent membrane printed with conductive carbon paste or silver ink trances may implement applications of a capacitive touchpad for electronic products where the touchpad is intended to reveal through a bottom side thereof. However, unlike the PCB trace whose impedance is so low as to be negligible, the trace made of ITO, IZO, conductive carbon paste, silver ink or the like exhibit a significant impedance, which will result in errors in sensed values of the touch sensor and disadvantageously affect touch positioning by the capacitive touchpad. As shown in FIG. 1, a capacitive touchpad 100 includes a touch sensor 110 and a controller 120. The touch sensor 110 shown therein is a two-dimensional one, which has sensing lines arranged in two directions, namely the group of X1, X2, . . . , Xm, XM and the group of Y1, Y2, . . . , Yn, . . . , YN. Typically, the two directions of the sensing lines are referred to as X direction and Y direction for convenience's sake. If the touch sensor 110 is realized by a PCB, the sensing lines X1, X2, . . . , Xm, . . . , XM and Y1, Y2, . . . , Yn, . . . , YN are copper traces on the PCB. If, for transparent applications, ITO or IZO is used to make the sensing lines X1, X2, . . . , Xm, . . . , XM and Y1, Y2, . . . , Yn, . . . , YN, then the substrate for the sensing lines can be made of glass, plastic or other transparent materials. If the sensing lines X1, X2, . . . , Xm, . . . , XM and Y1, Y2, . . . , Yn, . . . , YN are conductive carbon paste or silver ink, the substrate is a transparent membrane. The controller 120 is a semiconductor chip installed on a flexible printed circuit board (FPC) 115, and is connected to the sensing lines X1, X2, . . . , Xm, . . . , XM and Y1, Y2, . . . , Yn, . . . , YN by metal wires 125 printed on the FPC 115. The controller 120 has a detector circuit therein, to detect the capacitance variations along the sensing lines X1, X2, . . . , Xm, . . . , XM and Y1, Y2, . . . , Yn, . . . , YN. The detected capacitance variation is referred to as a sensed value, from which a position of an object touched on the touch sensor 110 can be determined.

Figure 2:
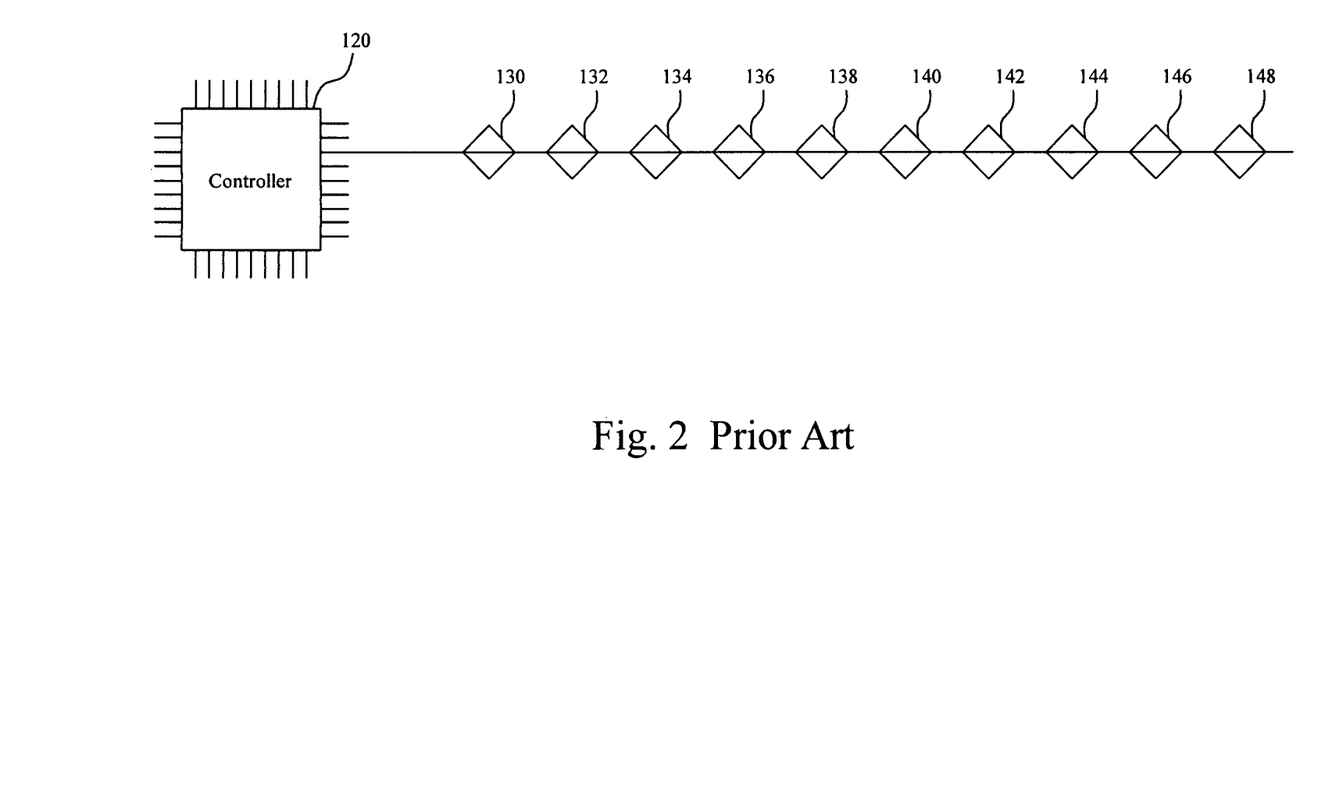
FIG. 2 is a schematic view of the structure of a typical sensing line.
Figure 3:
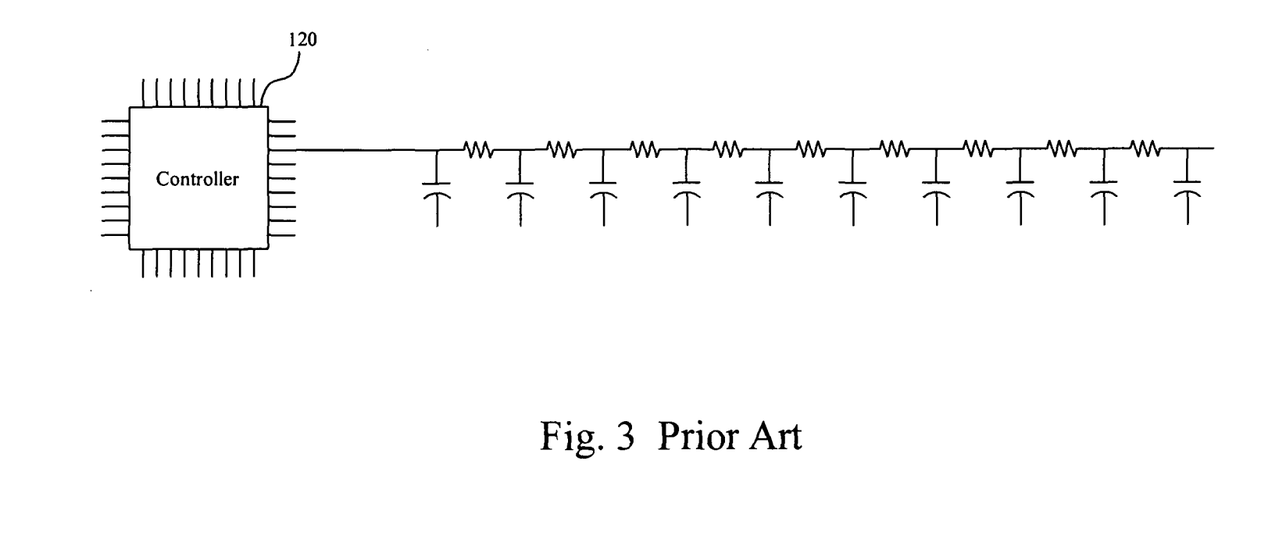
FIG. 3 is the equivalent circuit of the sensing line shown in FIG. 2.
Figure 4:
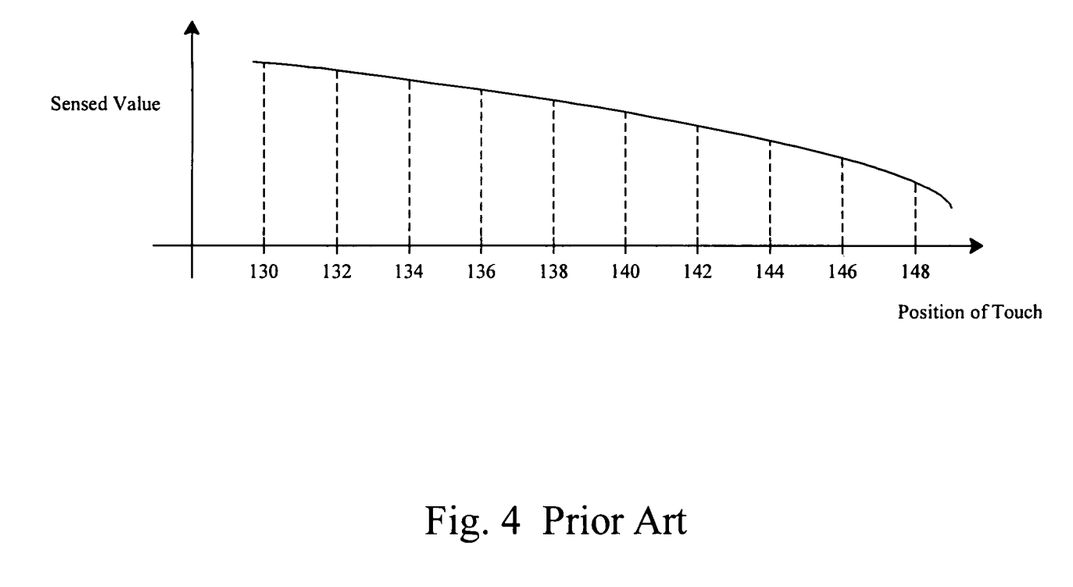
FIG. 4 is a schematic diagram showing the distribution of sensed values generated by touching the sensing line of FIG. 2 at different positions thereof.

In further detail, as shown in FIG. 2, a sensing line has many capacitive sensor pads 130 to 148 thereon. If this sensing line has an impedance so low as to be negligible, the sensed values generated by an object touch on anywhere of the sensor pads 130 to 148 are substantially equal, and allow the controller 120 to precisely determine, according to preset reference values, whether or not an object touch has been made. On the contrary, if the electric resistance of this sensing line is too large to be ignored, the sensing line of FIG. 2 will have an equivalent circuit as shown in FIG. 3, which will produce a resistor-capacitor (RC) filtering effect on the sensed values generated therefrom. As a result, referring to FIG. 4, when an object touches the sensing line at different sensor pads 130 to 148, the sensed values detected by the controller 120 will be different from each other and are attenuated with the distance between the controller 120 and the touched sensor pads 130 to 148. Consequently, there is a great difference between the sensed value corresponding to the nearest sensor pad 130, which is adjacent to the controller 120, and the sensed value corresponding to the farthest sensor pad 148, which is away from the controller 120. The attenuation of the sensed values due to actual impedance makes it difficult to make adjustments to the capacitive touchpad, or even impossible to detect a capacitance variation if a thicker medium is used in the touchpad. Moreover, even if an object touches a same sensing line, the sensed values corresponding to different sensor pads may be so significantly varied as to increase the chances of error actions resulted from misjudgments by the controller.

Figure 5:
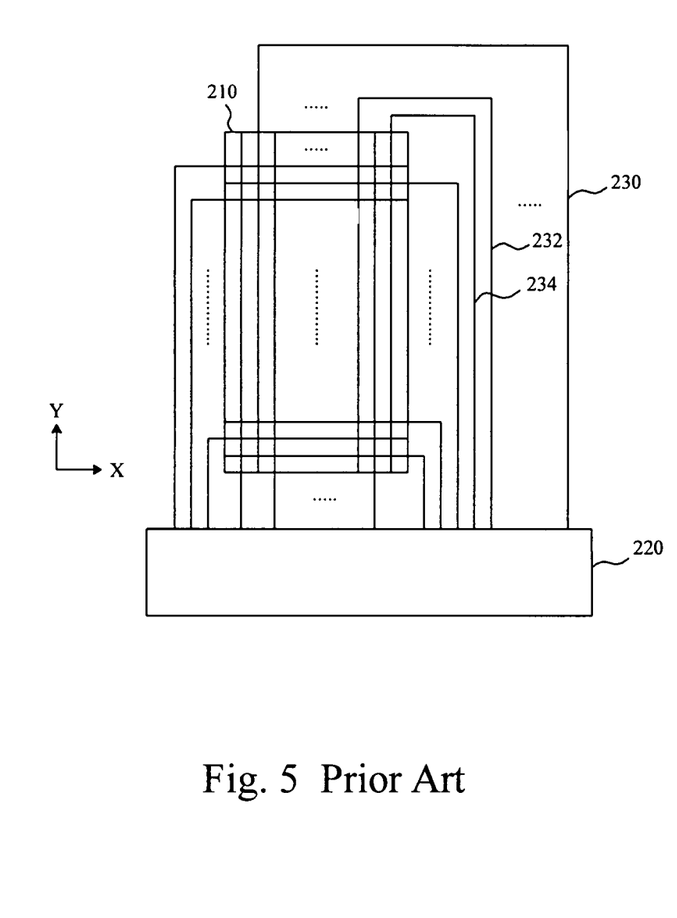
FIG. 5 is a schematic view of a capacitive touchpad having a rectangular touch sensor and interleaving sensing lines.

The problem resulted from the attenuation of the sensed values due to the impedance of a sensing line itself can be minimized by arranging all the sensing lines of a capacitive touchpad in an interleaving manner so as to homogenize the resistance/capacitance distribution of the sensing lines. However, for interleaving sensing lines arrangement, the sensing lines in X and Y directions are drawn to the controller from two opposite ends thereof and result in a rather complicated wiring layout. Moreover, as shown in FIG. 5, if a touch sensor 210 has a rectangular shape, and the sensing lines in X and Y directions are drawn to a controller 220 from two opposite ends thereof, the excessively long sensing lines 230 to 234 not only increase the difficulty in wiring layout, but also produce additional parasitic resistances, which will further increase the difficulty in signal processing as well.

SUMMARY OF THE INVENTION

An object of the present invention is to provide an equalized capacitive touchpad and a touch positioning method for a capacitive touchpad.

Another object of the present invention is to provide an apparatus and method for simplifying the wiring layout of a capacitive touchpad.

Yet another object of the present invention is to provide an apparatus and method for improving the touch positioning accuracy of a capacitive touchpad.

According to the present invention, an equalized capacitive touchpad and a touch positioning method use an equalizer to correct a sensed value detected from a sensing line to offset the attenuation of the sensed value due to the impedance of the sensing line. Thus, the sensed values generated from different positions along a sensing line are equalized and the touch positioning accuracy of the capacitive touchpad is improved.

A capacitive touchpad according to the present invention includes a touch sensor having a plurality of sensing lines connected to a controller which has a front-end circuit for scanning the sensing lines to generate sensed values.

Preferably, a sensed value in a first direction is used to determine a position information in the first direction for the equalizer to determine an equalization value according to an equalize function for a second direction, which is used to correct a sensed value in the second direction.

Preferably, the equalizer has a memory for storing the equalization value of the equalize function.

Preferably, the sensing lines in the first direction have a balanced resistance/capacitance distribution.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 6:
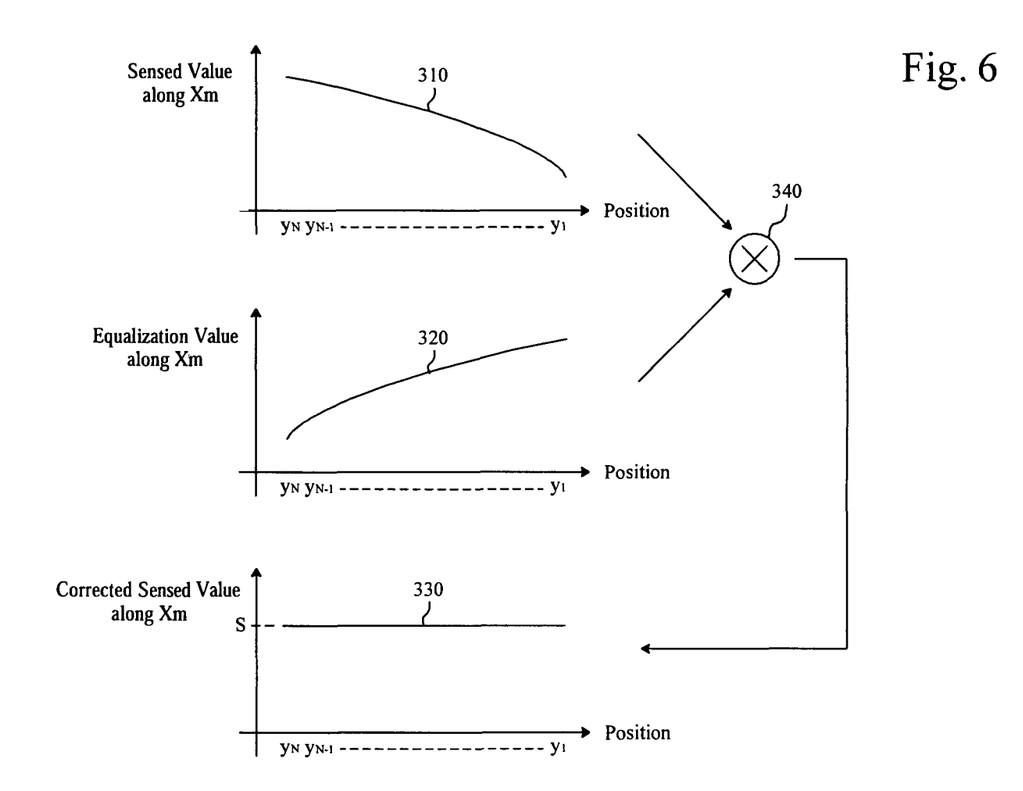
FIG. 6 is a diagram depicting the principle of the present invention to equalize the sensed values of a sensing line of a capacitive touchpad.

FIG. 6 depicts the principle of the present invention to equalize the sensed values of a sensing line of a capacitive touchpad. Taking the touch sensor 110 shown in FIG. 1 for example, the sensing lines X1, X2, . . . , Xm, . . . , XM in the X direction are orthogonal to the sensing lines Y1, Y2, . . . , Yn, . . . , YN in the Y direction. Therefore, positions on the sensing line Xm in the X direction can be defined by the positions y1, y2, . . . , yN of the sensing lines Y1, Y2, . . . , Yn, . . . , YN in the Y direction, as shown by the horizontal coordinates in FIG. 6. The vertical coordinates in FIG. 6 represent the analog-to-digital converter (ADC) counts, which are used to denote the sensed values detected by the controller 120 from the sensing lines of a general capacitive touchpad, and the ADC counts signify the magnitudes of capacitance variation along a particular sensing line. As shown by a curve 310 in FIG. 6, if the sensing line Xm has a significant resistance, the sensed value detected by the controller 120 will attenuate as the distance between the controller 120 and the touch point increases and as a result, the sensed value corresponding to the position y1 on the sensing line Xm will be lower than the sensed value corresponding to the position yN. An equalize function according to the present invention is shown by a curve 320, and has the equalization values corresponding to each of the positions y1, y2 . . . , yN to correct the sensed values corresponding thereto to thereby offset the attenuation effect. A processing unit 340 may correct the curve 310 according to the equalize function represented by the curve 320 to be an equalized curve 330. Actually, the structure of the sensing line Xm is not changed, and the original sensed values generated therefrom still follow the curve 310. However, the sensed values actually detected by a controller are calibrated by a pertinent software or hardware such that the sensed values corresponding to touches at positions y1, y2, . . . , yN on the sensing line Xm are all equal to a certain value S as shown by the curve 330. In an embodiment, the equalize function represented by the curve 320 is obtained from calculation based on the equivalent circuit shown in FIG. 3. In another embodiment, the equalization function represented by the curve 320 is deduced from the sensed values actually detected from the sensing line Xm.

In some other embodiments, the sensing lines may be arranged in directions other than the X and Y directions. In some other embodiments, the sensing lines are not necessarily divided into two groups that are orthogonal to each other, but two groups that intersect each other such that either one of the two groups can be used to define different positions on any single sensing line in the other group. The sensing lines in the embodiments hereinafter are arranged in the orthogonal X and Y directions to facilitate explanation so that features of the present invention can be more readily understood.

Figure 7:
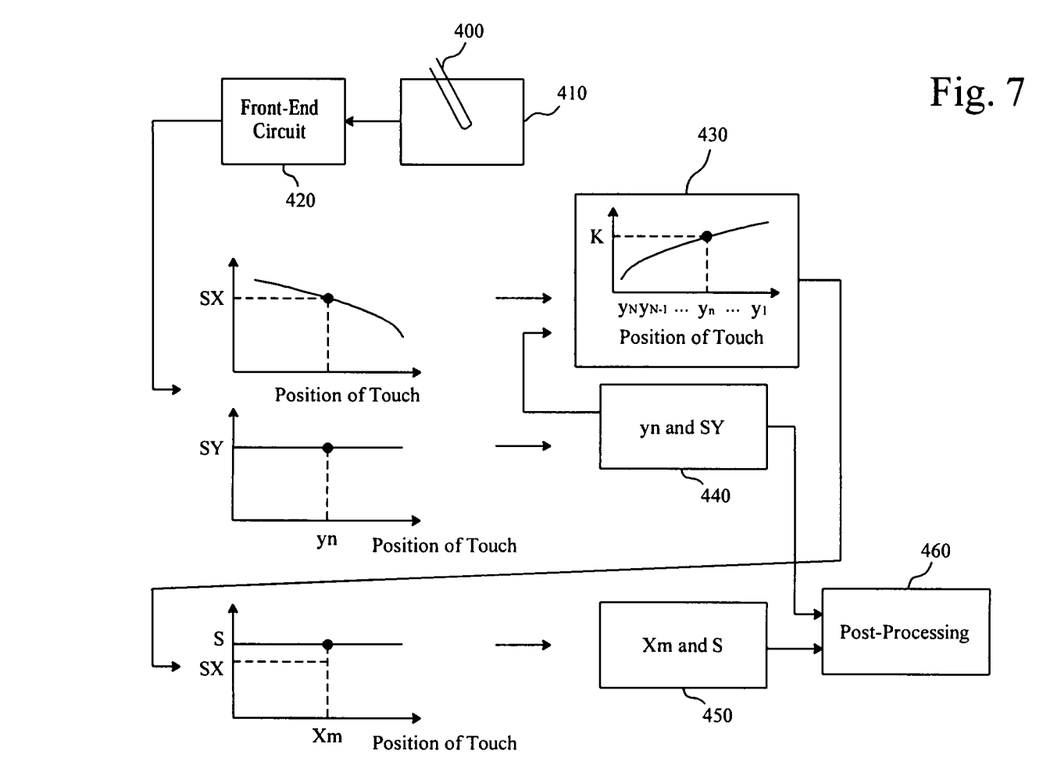
FIG. 7 a functional block diagram of a capacitive touchpad and a flowchart of a touch positioning method for the capacitive touchpad in an embodiment according to the present invention.

FIG. 7 shows a functional block diagram of a capacitive touchpad and a flowchart of a touch positioning method for the capacitive touchpad in an embodiment according to the present invention. For simplicity, it is assumed in this embodiment that the capacitive touchpad includes sensing lines in the Y direction having a balanced resistance/capacitance distribution. In other words, the attenuation effect on the sensing lines in the Y direction is excluded. When an object 400 touches a touch sensor 410, a front-end circuit 420 generates a sensed value SX in the X direction and a sensed value SY in the Y direction by scanning the sensing lines. The sensed values SY in the Y direction corresponding to touches at different positions are invariant with respect to positions of the object 400, while the sensed values SX in the X direction attenuate as the distance between the object 400 and the front-end circuit 420 increases. A Y-direction positioning step 440 determines a Y-direction position yn of the object 400 according to the sensed value SY in the Y direction, and information of this Y-direction position yn is provided to an equalizer 430 for the X direction. Based on the Y-direction position yn, the equalizer 430 determines an equalization value K according to an equalize function, and then corrects the sensed value SX in the X direction to be a corrected sensed value S, from which an X-direction positioning step 450 determines an X-direction position Xm of the object 400. The information of X-direction position X m and the Y-direction position yn as well as the sensed values S and SY of the object 400 are provided to a post-processing step 460 for further processing, such as to determine a moving speed or an acceleration of the object 400. Operations in the Y-direction positioning step 440, the X-direction positioning step 450 and the post-processing step 460 are in fact accomplished by the arithmetic unit of the controller and pertain to prior arts.

Figure 8:
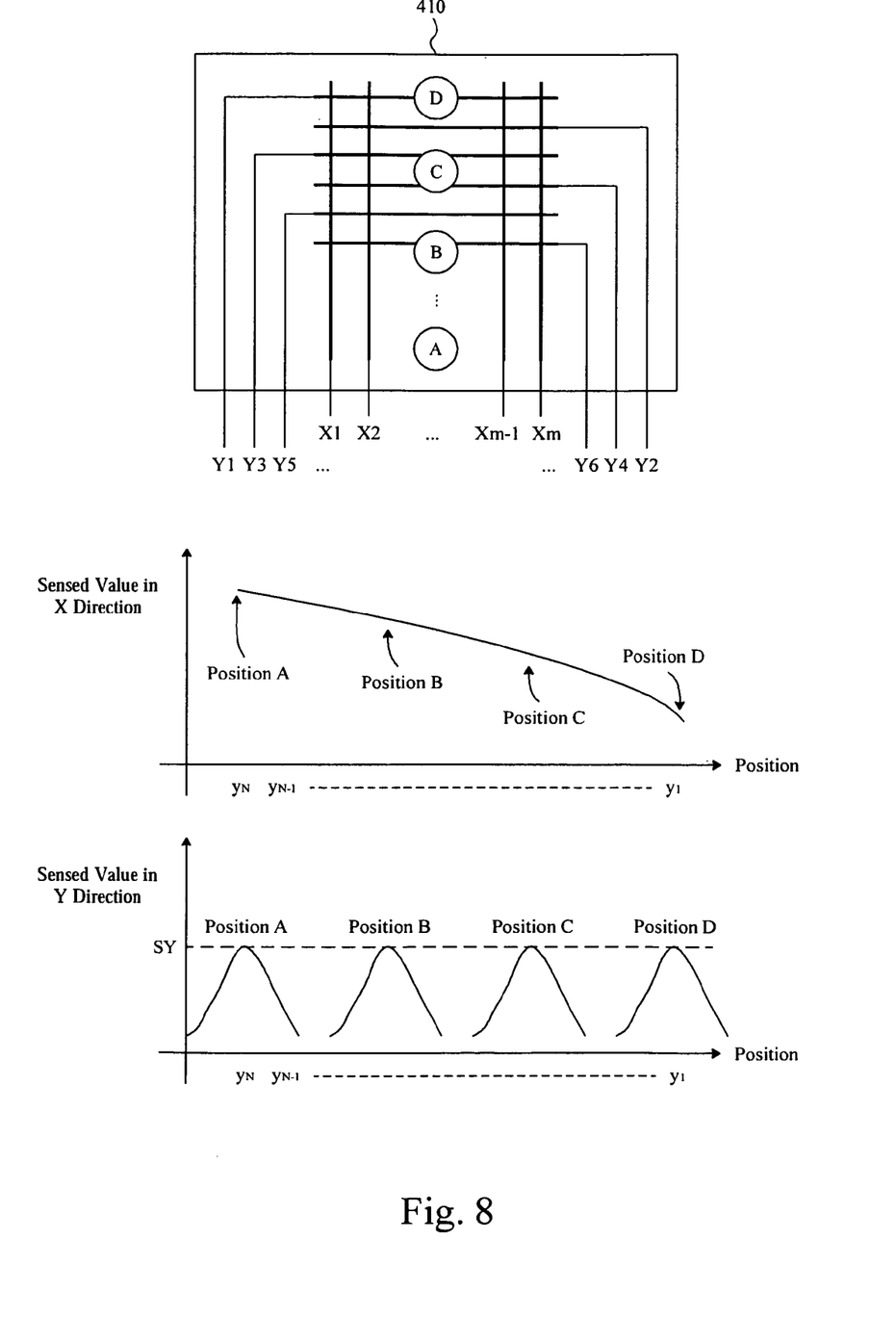
FIG. 8 is a schematic diagram showing the sensed values generated from a touch sensor that is touched at different times under a same condition.

When different positions A, B, C and D in the Y direction at a same position in the X direction of the touch sensor 410 are touched at different times under a same condition, the corresponding sensed values in the X and Y directions are shown in FIG. 8, in which the position A has the largest sensed value in the X direction, the position D has the smallest sensed value in the X direction, and the sensed values in the Y direction are not significantly varied with the different positions A, B, C and D. If the sensed values actually obtained are used for touch positioning, it may be impossible to accurately determine the position of each of A, B, C and D because the X-direction sensed values corresponding to the different positions A, B, C and D are great varied. If a user moves his finger from the position A to the positions B, C and D sequentially, the Y-direction sensed values clearly show a variation in the Y direction corresponding to contacts by the finger at the four positions, so that it can be further determined that the finger has moved in the Y direction. In the X direction, however, if the sensed values actually obtained are used for touch positioning, it may be impossible to accurately determine that the finger has actually stayed at a same position in the X direction. Nevertheless, after applying the aforementioned equalization described with reference to FIG. 7, the corrected X-direction sensed values will be able to clearly show a change of positions, as do the Y-direction sensed values.

Figure 9:
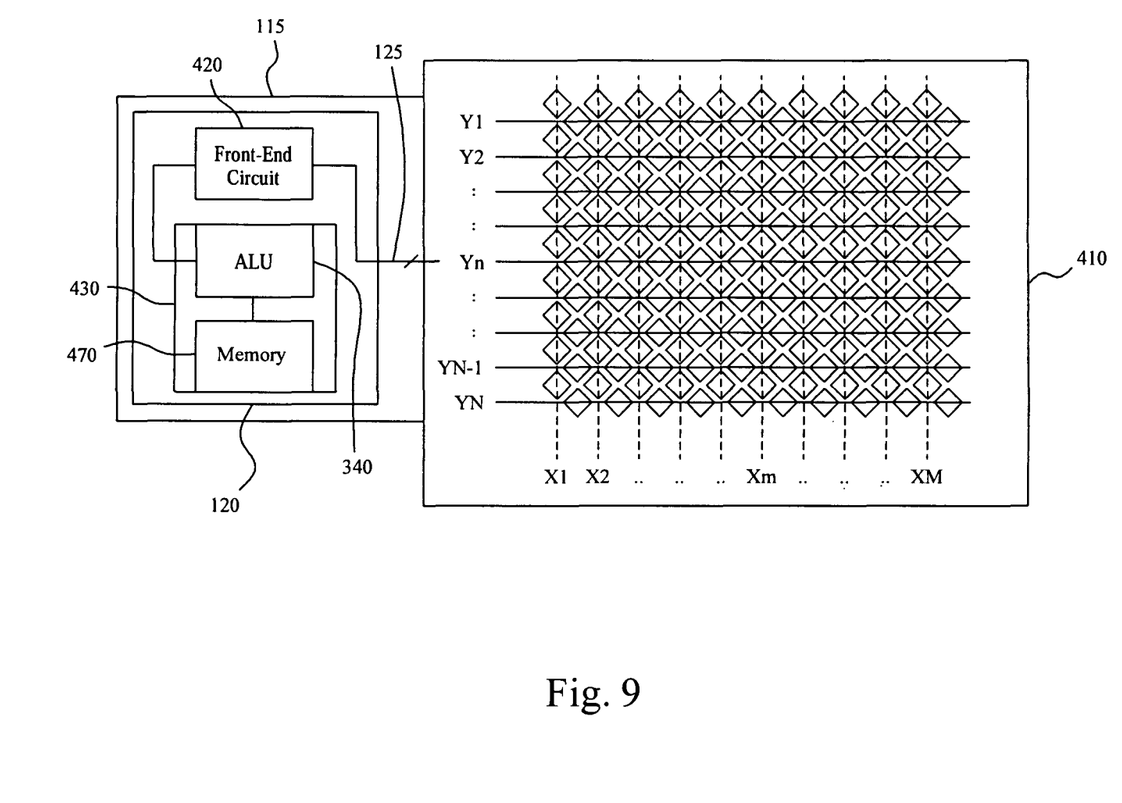
FIG. 9 is a diagram showing an embodiment of the equalizer according to the present invention.
Figure 10:
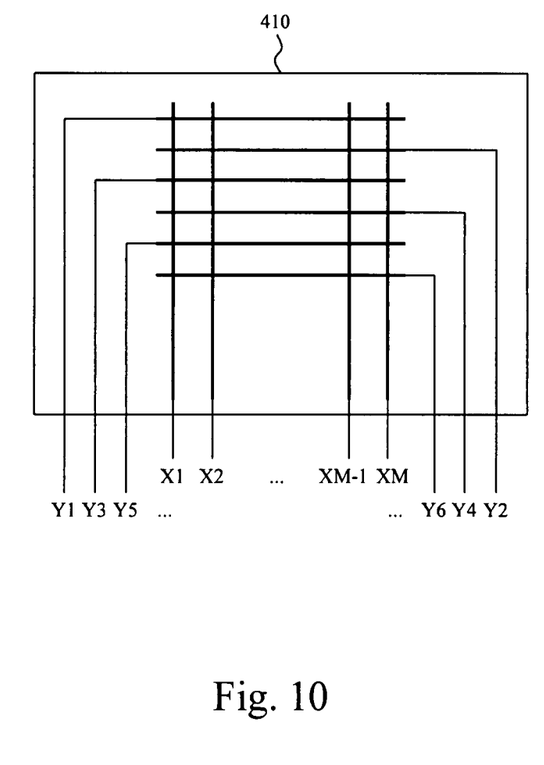
FIG. 10 is a diagram showing a first embodiment of the wiring layout of a touch sensor.
Figure 11:
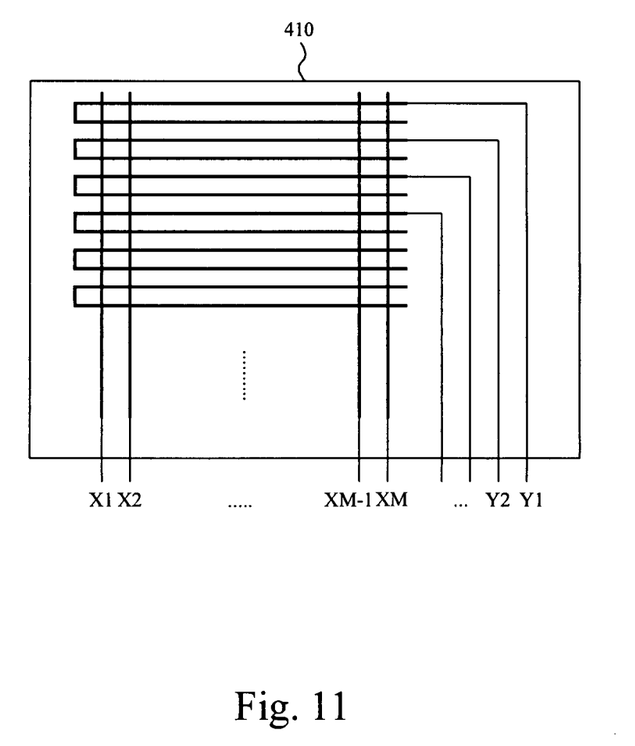
FIG. 11 is a diagram showing a second embodiment of the wiring layout of a touch sensor.
Figure 12:
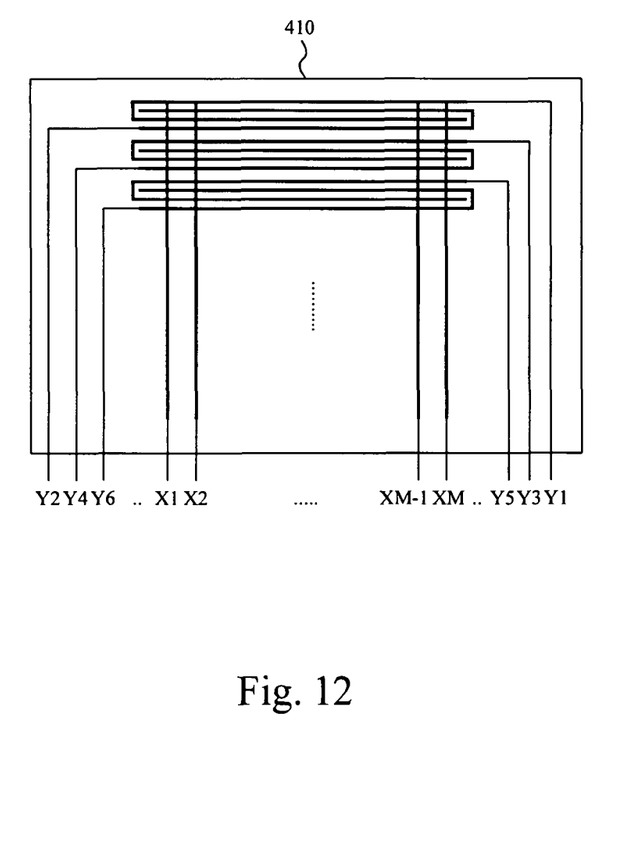
FIG. 12 is a diagram showing a third embodiment of the wiring layout of a touch sensor.
Figure 13:
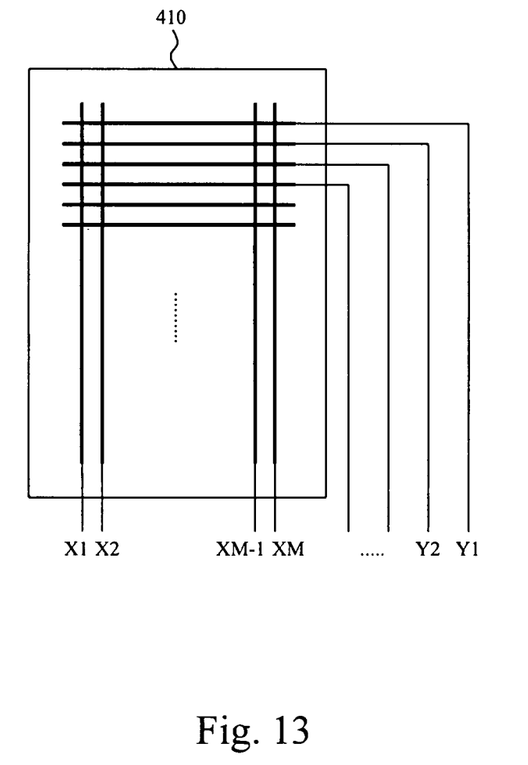
FIG. 13 is a diagram showing a fourth embodiment of the wiring layout of a touch sensor.

The equalizer 430 can be realized by hardware, software or a combination thereof, and an embodiment of the equalizer 430 is shown in FIG. 9, in which the sensing lines Y1, Y2, . . . , YN in the Y direction of the touch sensor 410 have a balanced resistance/capacitance distribution, and the controller 120 includes the equalizer 430. As described above, the sensing lines Y1, Y2, . . . , YN in the Y direction having the balanced resistance/capacitance distribution can be achieved with an interleaving wiring layout. FIG. 10 is a diagram showing an example of a wiring layout in which the sensing lines Y1, Y2, . . . , YN are interleaving while the sensing lines X1, X2, . . . , XM in the X direction are arranged in a same direction. FIG. 11 is a diagram showing another wiring layout in which the sensing lines Y1, Y2, . . . , YN in the Y direction are arranged in a same direction and each of them has a U shape to achieve a balanced resistance/capacitance distribution, while the sensing lines X1, X2, . . . , XM in the X direction are still arranged in a same direction. FIG. 12 is a diagram showing yet another wiring layout in which the sensing lines Y1, Y2, . . . , YN in the Y direction are interleaving and each of them has a U shape to achieve a balanced resistance/capacitance distribution, while the sensing lines X1, X2, . . . , XM in the X direction are still arranged in a same direction. The touch sensor 410 shown in FIG. 13 has a rectangular shape, and the sensing lines Y1, Y2, . . . , YN in the Y direction have shorter lengths so as to reduce the resistance/capacitance filtering effect to be one could be ignored, or could be eliminated with a circuit adjustment in order to equalize the sensed values thereof. On the other hand, the sensed values from the sensing lines X1, X2, . . . , XM in the X direction in FIG. 13 can be equalized by applying the aforementioned equalization thereto. Hence, not only can the sensing lines X1, X2, . . . , XM be arranged in a same direction, but also the sensing lines Y1, Y2, . . . , YN can be arranged in a same direction, thereby simplifying the wiring layout of the sensing lines. Referring back to FIG. 9, the controller 120 includes the front-end circuit 420 and the equalizer 430 that is realized by a combination of an arithmetic logic unit (ALU) 340 and a memory 470. The memory 470 stores the equalize function for the X direction, so that the ALU 340 can extract from the memory 470 an equlization value K of the equalize function that corresponds to a Y-direction position yn and thereby correct an X-direction sensed value SX into S, from which an X-direction position Xm can be further determined. The equalize function can be stored in the memory 470 as a lookup table where all the equalization values of the equalize equation are stored, so that the ALU 340 can read the equalization value K by looking it up in the table. In another embodiment, the memory 470 may store only a formula of the equalize function or certain parameters of the equalize function, with which the ALU 340 calculates data it receives to generate corresponding equalization values of the equalize function. In the embodiment shown in FIG. 9, no physical wiring is added to the controller 120, and operations of the equalizer 430 are executed by the ALU 340 and the memory 470 of the controller 120. Hence, no extra cost of hardware is incurred.

As demonstrated by the foregoing embodiments, the wiring layout of the touch sensor 410 can be simplified by properly arranging the sensing lines in the Y direction to eliminate variation resulted from attenuation, and using the equalizer 430 to correct the sensed values in the X direction.

Another advantage of using the equalizer 430 to correct the sensed values is ease of adjustment thereto. Although a designer of the controller 120 cannot control the degree of attenuation taking place along the sensing lines of the touch sensor 410, the equalize function stored in the controller 120 can be changed at any time, so that the equalize function in the controller 120 can be adjusted according to the touch sensor 410 actually used. Thus, the controller 120 is adaptive to various touch sensors 410 having different specifications, which also relieves the designer of the controller 120 from an otherwise difficult task.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An equalized capacitive touchpad, comprising:
  a touch sensor having a plurality of sensing lines in a first direction and a plurality of sensing lines in a second direction to generate, in response to a touch, a capacitance variation in the first direction and a capacitance variation in the second direction respectively;
  a front-end circuit coupled to the sensing lines, detecting the capacitance variations so as to generate a sensed value in the first direction and a sensed value in the second direction, wherein the sensed value in the second direction is used to determine a position information in the second direction; and
  an equalizer coupled to the front-end circuit, determining an equalization value according to the position information in the second direction, so as to correct the sensed value used to determine a position information in the first direction.

2. The equalized capacitive touchpad of claim 1, wherein the equalizer comprises:
  a memory storing an equalize function; and
  an arithmetic logic unit coupled to the memory, determining the equalization value according to the equalize function.

3. The equalized capacitive touchpad of claim 1, wherein the sensing lines in the second direction have a balanced resistance/capacitance distribution.

4. The equalized capacitive touchpad of claim 3, wherein the sensing lines in the second direction are interleaving arranged.

5. The equalized capacitive touchpad of claim 3, wherein the sensing lines in the second direction are arranged in a same direction and each of them has a U shape.

6. The equalized capacitive touchpad of claim 3, wherein the sensing lines in the second direction are interleaving arranged each of them has a U shape.

7. The equalized capacitive touchpad of claim 1, wherein the sensing lines are transparent.

8. The equalized capacitive touchpad of claim 1, wherein the sensing lines are made of an indium tin oxide, indium zinc oxide, carbon paste or silver ink.

9. The equalized capacitive touchpad of claim 1, wherein the sensing lines in the first direction intersect the sensing lines in the second direction.

10. The equalized capacitive touchpad of claim 1, wherein the sensing lines in the first direction intersect the sensing lines in the second direction orthogonally.

11. A touch positioning method for a capacitive touchpad, comprising the steps of:
   in response to a touch, generating a capacitance variation in a first direction and a capacitance variation in a second direction;
   detecting the capacitance variations so as to generate a sensed value in the first direction and a sensed value in the second direction;
   determining a position information in the second direction according to the sensed value in the second direction;
   determining an equalization value according to the position information in the second direction;
   correcting the sensed value used to determine a position information in the first direction with the equalization value; and
   determining the position information in the first direction according to the corrected sensed value in the first direction.

12. The touch positioning method of claim 11, wherein the step of determining an equalization value according to the position information in the second direction comprises the steps of:
   storing an equalize function; and
   determining the equalization value according to the equalize function.

13. The touch positioning method of claim 11, wherein the sensed values in the second direction are substantially equalized.

* * * * *